United States Patent [19]

Windish

[11] 4,368,652

[45] Jan. 18, 1983

[54] FRICTION ASSEMBLIES FOR USE IN PLANETARY TRANSMISSIONS

[75] Inventor: Willis E. Windish, Pekin, Ill.

[73] Assignee: Caterpillar Tractor Co., Peoria, Ill.

[21] Appl. No.: 187,694

[22] Filed: Sep. 16, 1980

Related U.S. Application Data

[63] Continuation-in-part of Ser. No. 900,633, Apr. 27, 1978, abandoned.

[51] Int. Cl.$^3$ ...................... F16H 57/10; F16D 55/40
[52] U.S. Cl. ..................................... 74/764; 188/71.5; 188/72.3; 188/73.2; 192/70.19; 192/70.28; 192/85 AA
[58] Field of Search ........................... 74/750 R, 764; 192/70.19, 70.28, 85 AA, 107 R; 188/71.5, 72.3, 73.2, 21 B XL

[56] References Cited

U.S. PATENT DOCUMENTS

| | | | |
|---|---|---|---|
| 1,554,394 | 9/1925 | White | 192/70.19 |
| 2,729,319 | 1/1956 | Friedman | 192/85 AA |
| 2,861,482 | 11/1958 | Schjolin | 74/781 |
| 2,981,126 | 4/1961 | Kelley | 74/731 |
| 3,292,758 | 12/1966 | Polak | 192/113 |
| 3,537,556 | 11/1970 | Pfeffer | 192/70.28 |
| 3,596,537 | 8/1971 | Koivunen | 74/750 R X |
| 3,747,729 | 7/1973 | Storer, Jr. | 192/70.28 |
| 3,937,303 | 2/1976 | Allen et al. | 192/107 R X |

FOREIGN PATENT DOCUMENTS

| | | | |
|---|---|---|---|
| 1069725 | 7/1954 | France | 192/70.28 |

Primary Examiner—Allan D. Herrmann
Attorney, Agent, or Firm—Wegner, Stellman, McCord, Wood & Dalton

[57] ABSTRACT

A reversible friction plate including a generally circular, disk-like member having generally parallel, opposed friction surfaces, an opening in the center of the member, at least three, equally angularly spaced tangs extending radially outwardly from the periphery of the member, reaction member receiving apertures in each tang displaced from the center thereof in the circumferential direction, the reaction member receiving apertures in each tang being equally angularly spaced, and a spring mounting formation on each tang displaced from the center thereof in the circumferential direction oppositely from the reaction member receiving apertures. Also disclosed is a friction pack utilizing a plurality of the friction plates and a planetary gear transmission employing such a friction pack which eliminates precision machining in the fabrication thereof.

13 Claims, 5 Drawing Figures

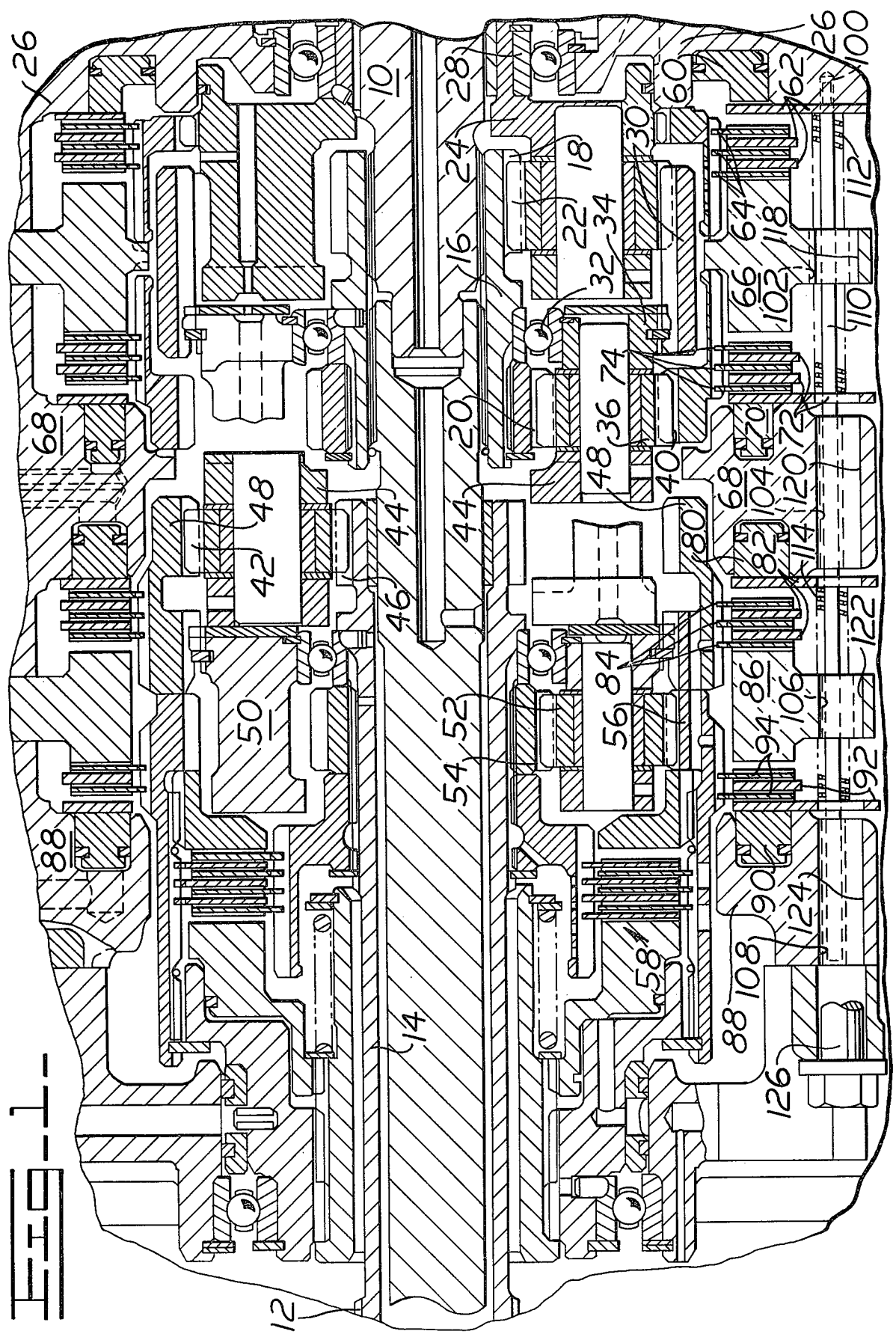

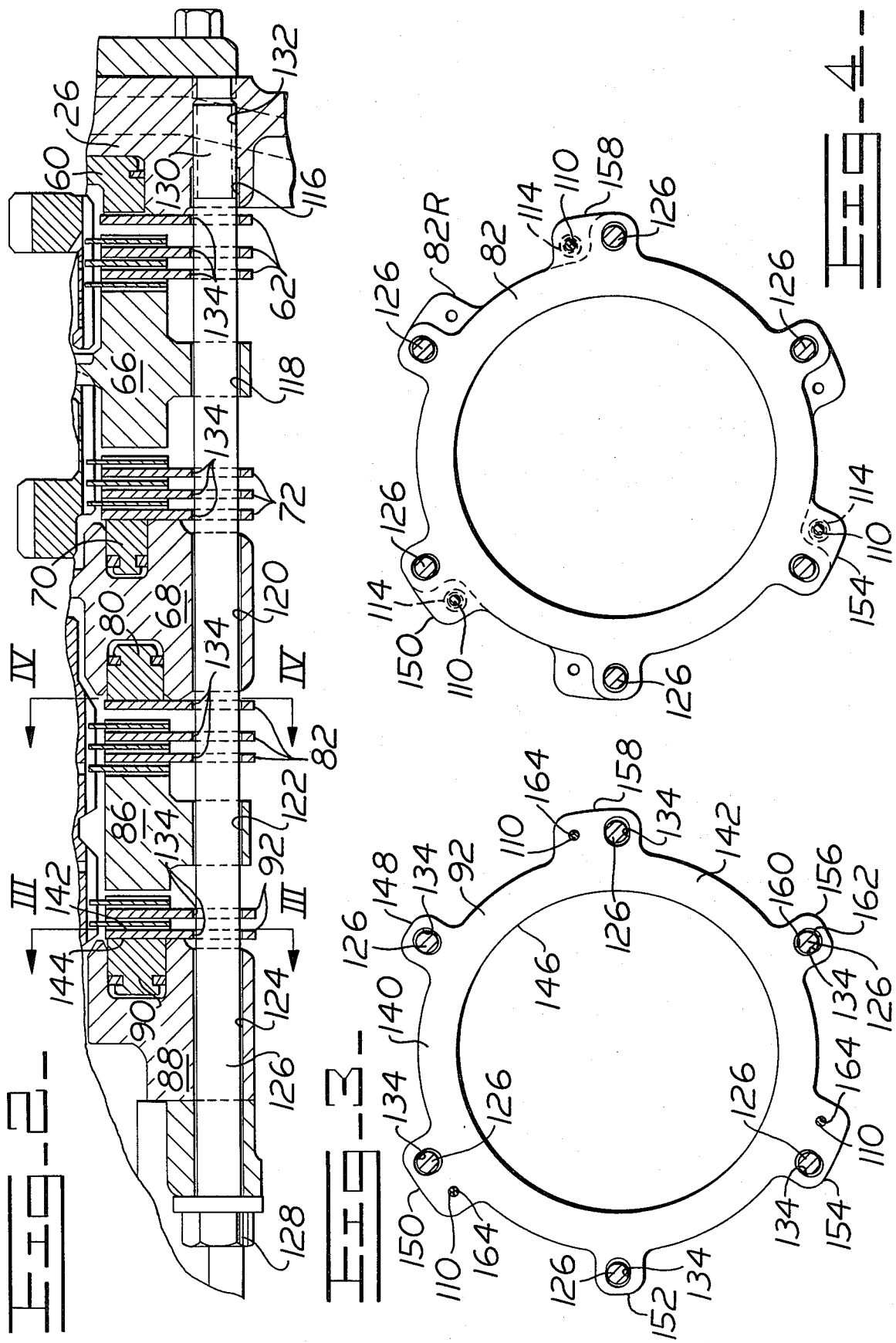

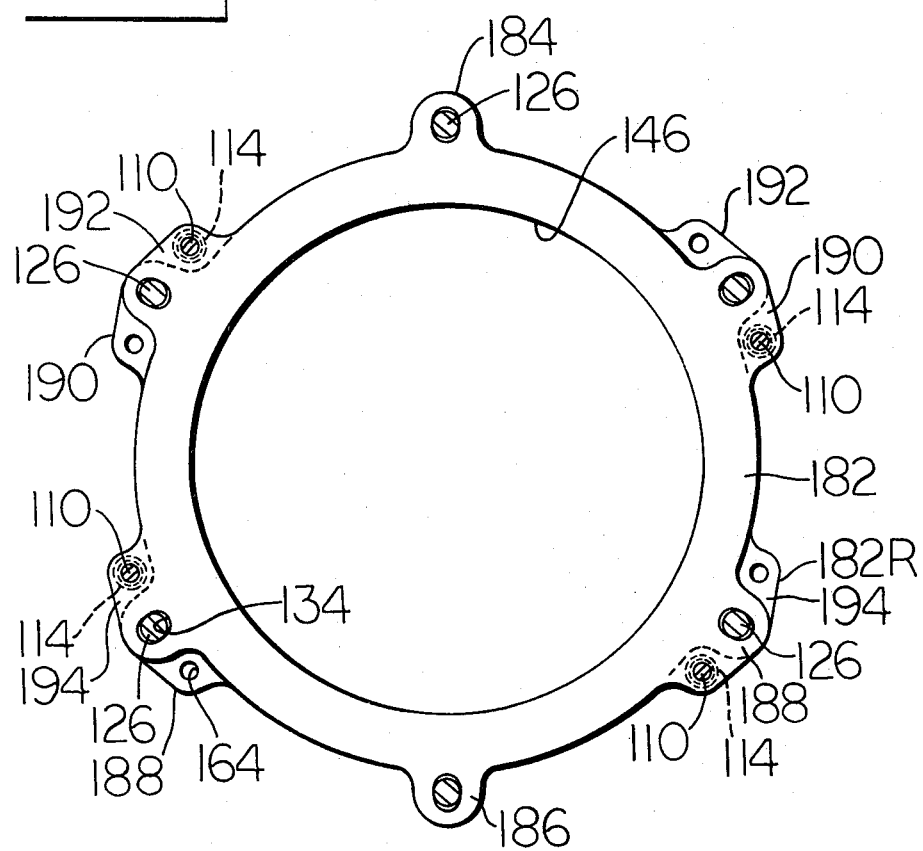

FRICTION ASSEMBLIES FOR USE IN PLANETARY TRANSMISSIONS

CROSS REFERENCE

This application is a continuation-in-part of my copending application Ser. No. 900,633 filed Apr. 27, 1978, now abandoned, and entitled "Friction Assemblies For Use In Planetary Transmissions".

BACKGROUND OF THE INVENTION

This invention relates to reversible friction plates, friction pack assemblies, and a planetary transmission in which the friction elements may be used.

A large variety of mechanisms utilized in machinery employ friction plates and packs of such friction plates. For example, heavy-duty clutches may utilize such plates and packs thereof as may heavy-duty disc brakes. Similarly, planetary gear mechanisms as, for example, transmissions, where large torques are involved, may use such friction packs for braking the ring gears of one or more planetary gear assemblies.

In many such mechanisms, particularly transmissions where plural friction packs are used, one for each planetary gear assembly, the stationary plates of each friction pack have been secured between housing parts in any of a variety of ways and, in the usual case, dowels have been employed to locate the housing parts with respect to each other in order to achieve proper orientation of the various components. Such dowels require precision machining in order to achieve precise alignment and, as a consequence, fabrication of such mechanisms is considerably more expensive than would be the case if precision machining could be minimized or eliminated altogether.

Moreover, the stationary friction plates in a given pack will not all be identical. In the typical case, where the pack is compressed by a fluid operated piston, a stationary plate will immediately abut the piston so as to avoid relative rotation between the two. In order to provide for retraction of the piston when the same is not subject to fluid under pressure, a retraction spring will be engaged with that stationary plate to apply therethrough a retracting force to the piston. The retraction spring will typically be operative axially of the pack with the consequence that the remaining stationary plates in the pack must be relieved in some fashion to accommodate the retraction springs.

As a consequence, both inventory and manufacturing problems arise in that two different types of stationary friction plates must be maintained on hand and, of course, be manufactured differently.

SUMMARY OF THE INVENTION

The present invention is directed to overcoming one or more of the above problems.

According to one facet of the present invention, precision machining techniques are minimized or eliminated in a planetary gear mechanism of the type including input and output shafts. At least one planetary gear assembly interconnects the shafts and includes a sun gear, a planet gear meshed with the sun gear and mounted by a carrier and a ring gear meshed with the planet gear. At least two housing parts at least partially enclose the planetary gear assembly and a friction assembly for braking the ring gear includes a piston, a first friction plate engageable by the piston and secured against rotation relative to the housing parts, a second friction plate aligned with and engageable by the first friction plate and mounted on the ring gear against relative rotation with respect thereto. A plurality of tie bolts assemble the housing parts and coil springs urge the first plate towards the piston and away from the second plate. According to the invention, the improved construction includes a plurality of aligned bores in the housing parts which are located radially outwardly of the planetary gear assembly. A plurality of pins are loosely received in corresponding ones of the bores to float therein and extend through the first friction plate. The coil springs are disposed on corresponding ones of the pins in abutment with the first plate and one of the housing parts. The construction eliminates the need for dowels and the costly precision machining parts associated therewith.

According to another facet of the invention, there is provided a reversible friction plate which includes a generally circular disk-like member having generally parallel, opposed friction surfaces. An opening is located in the center of the member. At least three angularly spaced tangs extend radially outwardly from the periphery of the member. Reaction member receiving apertures are located in each tang and are displaced from the center thereof in the circumferential direction. A spring mounting formation is located on each tang and is displaced from the reaction member receiving opening.

Such a friction plate can be used in any position in a friction pack, whether in abutment with the piston or remote therefrom.

Other objects and advantages will become apparent from the following specification taken in connection with the accompanying drawings.

DESCRIPTION OF THE DRAWINGS

FIG. 1 is a fragmentary, sectional view of a planetary gear transmission made according to the invention;

FIG. 2 is a further fragmentary view of the transmission;

FIG. 3 is a sectional view taken approximately along the line 3—3 of FIG. 2 illustrating a single friction plate made according to the invention;

FIG. 4 is a sectional view taken approximately along the line 4—4 in FIG. 2 illustrating a plurality of friction plates made according to the invention in alignment with each other; and FIG. 5 is a view similar to FIG. 4 but of a modified embodiment of friction plates made according to the invention.

DESCRIPTION OF THE PREFERRED EMBODIMENT

An exemplary embodiment of the invention is illustrated in the various figures of drawing and will be described herein in connection with a planetary gear transmission. It is to be understood, however, that certain aspects of the invention can be employed in mechanisms other than planetary gear transmissions. It is also to be understood that the following description of the planetary gear assemblies within the transmission will be described only broadly for the purpose of acquainting one with one environment of intended use, the precise nature of the planetary gear assemblies in the transmission, the gear ratios, and their interaction forming no part of the present invention.

With reference to FIG. 1, the transmission includes a rotatable input shaft 10 which may be driven by an engine via a torque converter or the like, neither one of which is shown. The output of the transmission is taken from gear teeth 12 on a quillshaft 14 disposed in concentric relation to the input shaft 10.

Splined to the input shaft 10, is a sun gear 16 having two sets of gear teeth 18 and 20. The teeth 18 are in mesh with a plurality of planet gears 22 (only one of which is shown) journalled on a rotatable carrier 24 which is journalled to a housing part 26 by bearings 28.

A ring gear 30 is meshed with the planet gears 22 and is journalled for rotation within the assemblage by bearings 32 via a carrier 34 for planet gears 36 (only one of which is shown) meshed with the gear teeth 20. A ring gear 40 is meshed with the planet gears 36.

A third set of planet gears including plural planets 42 (only one of which is shown) includes a carrier 44 therefor which is connected to the carrier 34. The planet gears 42 are meshed with a sun gear 46 on the quillshaft 14 and a ring gear 48.

A carrier 50 for a fourth planetary gear assembly is connected to the ring gear 48 and mounts a plurality of planet gears 52 (only one of which is shown) which engage a sun gear 54 splined to the quillshaft 14 and a ring gear 56.

The ring gear 56 is selectively connectible to the quillshaft 14 via a rotating, piston operated, rotatable clutch assembly, generally designated 58, of conventional construction.

The housing part 26 includes an annular chamber receiving an annular piston which is operative to drive a stationary friction plate 62 in the axial direction to compress a friction pack including additional stationary plates 62 and interleaved rotatable plates 64 against a housing part 66. The housing part 66 is held against rotation by being sandwiched between the housing part 26, as best seen in the upper right-hand part of FIG. 1, and a housing part 68. The rotatable friction plates 64 are splined to the carrier 24, with the consequence that when the piston 60 is extended, the carrier 24 will be braked to halt the rotation thereof.

The housing part 68 includes an annular chamber receiving an annular piston 70 which is abutted by a stationary friction plate 72 identical to the friction plate 62 and which is operable to compress a friction pack including additional stationary friction plates 72 and interleaved rotatable friction plates 74. The pack is compressed against the housing part 66.

The rotatable friction plates 74 are splined to the ring gear 40 of the second planetary gear assembly and when the piston 70 is extended, at some point in time, the ring gear 40 will be braked to a halt. As is well known, controls are provided so that the pistons 60 and 70 are never simultaneously pressurized.

The housing part 68 includes an additional annular chamber receiving an annular piston 80 which is abutted by a stationary friction plate 82 which is identical to the friction plates 62 and 72. The friction plate 82 can compress a further friction pack including additional stationary friction plates 82 and interleaved rotatable friction plates 84 against a housing part 86. The housing part 86 is held stationary by being sandwiched between the housing part 68 and a housing part 88, as best seen in the upper center of FIG. 1. The rotatable friction plates 84 are splined to the carrier 50 of the third planetary gear assembly and thus, when compressed against the plates 82, will halt rotation of the same.

The housing part 88 includes an annular chamber receiving an annular piston 90 which abuts a stationary friction plate 92. The stationary friction plate 92 can compress a friction pack including an additional stationary friction plate 92 and interleaved rotatable friction plates 94 against the housing part 86. The friction plates 92 are identical to the friction plates 62, 72 and 82. When the piston 90 is extended to compress the pack, including the plates 92 and 94, the ring gear 56 for the fourth planetary gear assembly will be braked. Again. suitable controls are provided so as to prevent simultaneous pressurization of the pistons 80 and 90.

Those skilled in the art will readily appreciate that the input shaft and the output quillshaft 14 can be selectively coupled through the various planetary gear assemblies and/or the movable clutch 58 to provide a large variety of gear ratios.

According to a first embodiment of the invention, a unique structure is provided for causing the pistons 60, 70, 80 or 90 to retract when they are not subjected to fluid under pressure. In particular, at equally angularly spaced locations, in the preferred embodiment, three such locations spaced at 120° are provided, the various housing parts are provided with bores which may align. As seen in FIG. 1, the housing part 26 is provided with such a bore at 100, the housing 66 at 102, the housing part 68 at 104, the housing part 86 at 106 and the housing part 88 at 108. The bores 102 and 106 are larger than the bores 100, 104 and 108, and, in the aligned ones of the bores 100–108, there is loosely received a floating, elongated pin 110. The pin 110 extends through holes, to be described, in each of the stationary friction plates 62, 72, 82 and 92 in abutment with the corresponding pistons 60, 70, 80 and 90. The pin 110 does not however, extend through the remaining stationary plates 62, 72, 82 and 92, as will be seen.

A compression coil spring 112 is disposed about the pin 110 so as to extend through the bore 102 and abut the stationary plates 62 and 72 in abutment with the pistons 60 and 70. A similar compression coil spring 114 extends through the bore 106 to abut the stationary friction plates 82 and 92 in abutment with the pistons 80 and 90. As a consequence of this construction, those stationary plates 62, 72, 82 and 92 in direct abutment with the pistons 60, 70, 80 and 90 are spring biased by the associated spring 112 or 114 in such a way as to cause the associated piston to be moved to its retracted position. Thus, when pressurized fluid is not applied against one of the pistons, it will be moved to a retracted position to release compression on the associated friction pack. This construction assures proper retraction of the pistons and the release of compression in all friction packs when desired and because the bores are of greater diameter than the pin 110, allowing the latter to float, large tolerances may be employed eliminating the need for precision machined bores and their associated dowels.

Circumferentially spaced from the bores 100–108 and at equally angularly spaced locations about the centerline of the shaft 10, are a plurality of additional bores, in an exemplary embodiment, six in number. The housing part 26 includes such a bore at 116, the housing part 66, a bore 118, the housing part 68, a bore 120, the housing part 86, a bore 122, and the housing part 88, a bore 124. Corresponding ones of the bores 116–124 are aligned for receipt of a corresponding number of tie bolts 126.

As best seen in FIG. 2, the tie bolts 126 have hex heads 128 at one end and threaded ends 130 oppositely thereof threadably received in threaded parts 132 of the bore 116 in the housing part 26. The tie bolts act to hold the components in assembled relation, as is well known.

In addition, the tie bolts 126 serve as reaction members for all of the stationary friction plates 62, 72, 82 and 92, including the plates 62, 72, 82, 92 in direct abutment with the pistons 60, 70, 80 and 90.

In particular, each of the plates 62, 72, 82 and 92 is provided with a plurality of apertures 134 through which corresponding ones of the tie bolts 126 extend.

In a highly preferred embodiment, the tie bolts 126 at least are surface hardened to a greater hardness than that of the friction plates 62, 72, 82 and 92 in the vicinity of the apertures 134. This assures that wear due to torque reaction upon engagement of the various friction packs is confined to the friction plate and will not occur in the surface of the tie bolts 126 abutted by the friction plates.

FIG. 3 illustrates a first embodiment of a single friction plate which may be used as any one of the friction plates 62, 72, 82 and 92. While the illustration of FIG. 3 is specifically concerned with the plate 92 in abutment with the piston 90, for reasons that follow, it will be appreciated that its construction is typical.

The friction plate 92 in FIG. 3 is formed of a generally circular disk-like member 140 having opposed friction surfaces 142 and 144 (FIG. 2) which are parallel to each other. The member 140 includes a central circular opening 146 as well as a plurality of substantially equally angularly spaced tangs 148, 150, 152, 154, 156 and 158 extending radially outwardly from the periphery of the member 140. According to the invention, the number of the tangs 148–158 will be equal to n and, preferably, but not always, n is an even integer, i.e., 2, 4, 6, 8, etc.

As illustrated in FIG. 3, every second tang has at least one dimension greater than that of the remaining tangs. As seen in FIG. 3, the tangs 150, 154 and 158 have a greater width than the tangs 148, 152 and 156, that is, the greater dimension extends circumferentially of the disk 140. According to the first embodiment of the invention, every Xth tang has such a greater dimension. Preferably, but not always, X will be an integer of 2 or more. When X is an integer of 2 or more, the quantity n/X is equal to an integer of 2 or more.

Each of the tangs 148–158 includes an tie bolt receiving aperture 134 and it will be observed from FIG. 3 that the apertures 134 are equally angularly spaced. Moreover, they are equally radially spaced from the center of the disk 140 and preferably are radially elongated as, for example, by being formed as two intersecting, nonconcentric bores 160 and 162. Because of the radial elongation of the apertures 134, they may shift somewhat to self-align the center of rotation of their associated friction pack, again, eliminating the need for precision machining.

It will also be observed that the apertures 134 in the tangs 150, 154 and 158 are displaced to one side of the center of such tangs.

Displaced to the side of the center of the larger tangs 150, 154 and 158, oppositely from the apertures 134, are holes 164. The holes 164, when used, receive the pins 110 and the immediately surrounding area of each tang 150, 154 and 158, when the holes 164 receive the pins 110, will be abutted by one of the springs 112 or 114.

In a highly preferred embodiment, there will be at least three of the larger tangs provided. Where the larger tangs have their larger dimension extending in the circumferential direction, the smaller tangs 148, 152 and 156 may be dispensed with in favor of the large tangs entirely. Generally, however, there will be at least three of the large tangs and at least three of the small tangs to ensure adequate guidance for the stationary plates as well as to prevent the existence of cocking forces which might cause the plates to bind on the tie bolts 126. Of course, utilizing smaller tangs, such as is shown in FIG. 3 for the tangs 148, 152 and 156, minimizes material costs and therefore is preferable.

As a result of the foregoing construction, a reversible friction plate is formed. Such a plate can be used in any one of the stationary friction plate positions illustrated and is not restricted to use as a friction plate abutting one of the pistons. FIG. 4 illustrates how such plates are oriented with respect to each other in the pack to achieve this function. The forwardmost friction plate illustrated in FIG. 4 is the friction plate 82 in abutment with the piston 80 and, it will be seen that even through the piston 80 acts oppositely of the piston 90, the forwardmost friction plate 82 is disposed identically to the friction plate 92 abutting the piston 90. The coil springs 114 are illustrated in dotted lines surrounding the pins 110 and, as will be appreciated from FIG. 1, are in abutment with the rear side of the forwardmost plate 82.

Also shown in FIG. 4 is a friction plate 82 not in direct abutment with the piston 80 and such a friction plate is given the designation 82R in FIG. 4. The plate 82R is identical to the plate 82 but has been rotated about a diameter thereof through 180°, i.e, flipped. It is also rotated about its center such that the apertures 134 in the plate 82 and the apertures 134 in the plate 82R are aligned to receive the tie bolts 126. This results in a pack configuration wherein the rear side of the larger tangs 150, 154 and 158 of the forwardmost plate 82 have parts directly facing a remote housing part, such as the housing part 86 (FIG. 2) so that the springs 114 may abut the same without interference or contact with any of the tangs on the rearwardmost plate 82R.

A modified embodiment of an assembly of friction plates made according to the invention is illustrated in FIG. 5. In describing the embodiment of FIG. 5, elements identical to those heretofore described in connection with the embodiments of FIGS. 1-4 are given like reference numerals or, if not specifically mentioned, have the same construction and purpose as the correspondingly numbered elements heretofore described.

A friction plate 182 is located forwardly of an identical, but reversed friction plate 182R. As previously described in connection with FIG. 4, the friction plate 182 is adapted to be in abutment with one of the pistons in the transmission while the plate 182R is a stationary plate located elsewhere in the pack.

According to the embodiment of FIG. 5, there is provided a first plurality of n tangs extending radially outwardly from the plate 182. As specifically illustrated, there are six such tangs 184, 186, 188, 190, 192 and 194 on each of the plates. Each tang includes an aperture 134 for receipt of a corresponding tie bolt 126 to act as a reaction member. The tangs 188–194, inclusive, have one dimension that is greater than the corresponding dimension of the tangs 184 and 186, specifically, a greater dimension in the circumferential direction. The tangs 188–194 form a second plurality of p tangs within the first plurality of n tangs.

In the embodiment of FIG. 5, both n and p are always even integers and generally, but not always, p will be an even integer less than n. As seen in FIG. 5, n is equal to six while p is equal to four.

Each of the tangs 188-194, in that portion that is wider than the tangs 184 and 186, carries one of the apertures 164 to receive the pins 110 and to be abutted by springs such as the springs 112 or 114, the latter being shown in FIG. 5.

Each of the narrow tangs 184 and 186 has a diametrically opposite counterpart and the same is true for each of the tangs 188-194, inclusive.

While FIG. 5 illustrates the tangs to be equally angularly spaced, such need not be the case. So long as each tang has a diametrically opposite counterpart and the location of the tangs is such as to locate them in symmetrical positions with respect to a predetermined diameter, it is not necessary that there be equally angularly spacing. In the embodiment illustrated in FIG. 5, such a predetermined diameter can be either the diameter extending through the tangs 184 and 186 or a diameter transverse to the diameter extending through the tangs 184 and 186.

As a consequence of this construction, to achieve the results of the invention as previously described, it is merely necessary to flip the plates not to be engaged by spring 114 such as the plate 182R through 180° about such predetermined diameter. In the embodiment illustrated in FIG. 5, the plate 182R has been rotated about the diameter extending between the tangs 184 and 186. Thus, one plate configuration provides plates which can serve alternately as spring biased plates or non-spring biased plates without causing interference with the spring bias and components.

It will accordingly be appreciated that a reversible friction plate made according to the invention can be utilized at any position in a friction pack whereat a stationary clutch plate is required. As a result, the requirement for two, dissimilar, types of stationary plates in a single friction pack frequently required by the prior art is eliminated. Inventory expenses are thereby reduced as are manufacturing costs, since only one plate, as opposed to two, need to be manufactured and stocked. This feature of the invention can be employed in a variety of mechanisms, as mentioned previously, and is particularly useful in connection with the mechanism such as illustrated in FIGS. 1 and 2 made according to the invention wherein precision machining is eliminated.

I claim:

1. In a planetary gear mechanism including input and output shafts;
    at least one planetary gear assembly interconnecting the shafts and including a sun gear, a planet gear meshed with the sun gear and mounted by a carrier and a ring gear meshed with the planet gear;
    at least two housing parts at least partially enclosing the planetary gear assembly;
    a friction assembly including a piston, a first friction plate engageable by the piston and secured against rotation relative to the housing parts, a second friction plate aligned with and engageable by the first friction plate and mounted on said one of the ring gear and the carrier against relative rotation with respect thereto;
    a plurality of tie bolts assembling said housing parts, and coil springs urging said first plate towards said piston and away from said second plate;
    the improvement comprising a plurality of aligned bores in said housing parts radially outwardly of the planetary gear assembly and a plurality of pins, each said pin loosely received in corresponding ones of said aligned bores in said housing parts and extending through said first plate, said bores being of larger size than the corresponding pin so that each said pin floats in its bores enabling the use of large tolerances, said coil springs being disposed on corresponding ones of said pins in abutment with said first plate and one of said housing parts.

2. The planetary gear mechanism of claim 1 wherein there are a plurality of said planetary gear assemblies and the number of said housing parts exceeds the number of said planetary gear assemblies, and each said pin links several of said housing parts and mounts a plurality of said coil springs.

3. The planetary gear mechanism of claim 1 wherein there are a plurality of said planetary gear assemblies and each said pin is common to at least some of said planetary gear assemblies and mounts the coil springs for the planetary gear assemblies to which it is common.

4. A reversible friction plate, comprising:
    a generally circular, disk-like member having generally parallel, opposed, friction surfaces;
    an opening in the center of said member;
    n substantially equally angularly spaced tangs extending radially outwardly from the periphery of said member, where "n" is an even integer,
    every Xth tang having at least one dimension greater than that of the remaining tangs, wherein "X" is an integer of 2 or more and wherein n/X is equal to an integer of 2 or more;
    a plurality of equally angularly and radially spaced apertures, one in each tang, for receipt of reaction members; and
    a plurality of spring mounting formations, one on each Xth tang on the part thereof having said greater dimension.

5. The friction plate of claim 4 wherein said greater dimension extends in the circumferential direction.

6. The friction plate of claim 4 wherein said spring mounting formation comprise a hole in each Xth tang.

7. The friction plate of claim 4 wherein said apertures are radially elongated.

8. The friction plate of claim 4 wherein said spring mounting formations comprise a hole in each Xth tang, said greater dimension extends circumferentially, said apertures are radially elongated; n is equal to at least 6, and n/X is equal to at least 3.

9. A friction pack comprising at least first and second identical friction plates, each first and second friction plate being a generally circular, disk-like member having generally parallel, opposed, friction surfaces;
    an opening in the center of said member;
    n substantially equally angularly spaced tangs extending radially outwardly from the periphery of said member where "n" is an even integer;
    every Xth tang having at least one dimension greater than that of the remaining tangs, wherein "X" is an integer of two or more and wherein n/X is equal to an integer of two or more;
    a plurality of equally angularly and radially spaced apertures, one in each tang, for receipt of reaction members; and
    a plurality of spring mounting formations, one on each Xth tang on the part thereof having said greater dimension, said friction pack having a third friction plate interposed between said first and second friction plates, one of said first and second friction plates being reversed with respect to the others such that said apertures in one said plate are axially aligned with apertures in the other said plate and the spring mounting formations on one said plate are out of axial alignment with the spring mounting formations on the other plate.

10. A friction pack comprising at least first and second identical friction plates, each said first and second friction plates including a generally circular, disk-like member having generally parallel, opposed, friction surfaces;

an opening in the center of said member;

at least three angularly spaced tangs extending radially outwardly from the periphery of said member;

reaction member receiving apertures in each tang displaced from the center thereof in the circumferential direction, the reaction member receiving apertures in each tang being angularly spaced; and a spring mounting formation on each tang and displaced from the center thereof in the circumferential direction oppositely from said reaction member receiving apertures;

said friction pack having a third friction plate interposed between said first and second friction plates, one of said first and second friction plates being reversed with respect to the other such that the apertures in one said plate are axially aligned with apertures in the other said plate and the spring mounting formations on one said plate are out of axial alignment with the spring mounting formations on the other plate.

11. The friction pack of claim 10 further including a plurality of reaction members comprising tie bolts extending through corresponding aligned ones of said apertures and adapted to secure said friction pack between two housing parts or the like, said tie bolts having a greater surface hardness than said tangs whereby wear due to torque reaction will occur in said tangs rather than in said tie bolts.

12. A reversible friction plate comprising:

a generally circular, disk-like member having generally parallel, opposed, friction surfaces;

an opening in the center of said member;

a first plurality of n angularly spaced tangs extending radially outwardly from the periphery of said member, where "n" is an even integer;

said first plurality of tangs including a second plurality of p tangs being defined by predetermined ones of said n tangs and each having at least one dimension greater than that of the remaining tangs, where "p" is an even integer;

a plurality of angularly spaced apertures, one in each tang, for receipt of reaction members; and a plurality of spring mounting formations, one on each of said second plurality of tangs on the part thereof having said greater dimension;

each of said remaining tangs being located diametrically opposite of another of said remaining tangs, each of the tangs of said second plurality being located diametrically opposite of another of said tangs of said second plurality, and all of said tangs being located about said member in symmetrical positions with respect to a predetermined diameter thereof.

13. The reversible friction plate of claim 12 wherein said greater dimension extends in the circumferential direction.

* * * * *